(12) United States Patent
Kagawa et al.

(10) Patent No.: US 8,936,341 B2
(45) Date of Patent: Jan. 20, 2015

(54) INKJET PRINTER AND IMAGE PROCESSOR FOR CORRECTING IMAGE DATA BASED ON COLOR SPECIFICATION VALUES AND A TARGET COLOR SPECIFICATION VALUE

(75) Inventors: Hidetsugu Kagawa, Kawasaki (JP); Nobutaka Miyake, Yokohama (JP); Tohru Ikeda, Yokohama (JP); Akitoshi Yamada, Yokohama (JP); Mitsuhiro Ono, Tokyo (JP); Fumitaka Goto, Tokyo (JP); Ryosuke Iguchi, Kawasaki (JP); Tomokazu Ishikawa, Kawasaki (JP); Junichi Nakagawa, Tokyo (JP); Senichi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 12/964,129

(22) Filed: Dec. 9, 2010

(65) Prior Publication Data

US 2012/0081449 A1   Apr. 5, 2012

(30) Foreign Application Priority Data

Oct. 5, 2010   (JP) ................................. 2010-225749

(51) Int. Cl.
*B41J 29/393* (2006.01)
*H04N 1/60* (2006.01)
*B41J 2/21* (2006.01)

(52) U.S. Cl.
CPC ............. *H04N 1/6033* (2013.01); *B41J 2/2128* (2013.01)
USPC .......................................................... 347/19

(58) Field of Classification Search
None
See application file for complete search history.

(56) References Cited

U.S. PATENT DOCUMENTS

| 6,025,929 | A  | * | 2/2000 | Nakajima et al. | 358/1.9 |
| 6,390,583 | B1 | * | 5/2002 | Kato et al. | 347/15 |
| 6,450,606 | B1 | * | 9/2002 | Kato et al. | 347/19 |
| 6,474,768 | B1 |   | 11/2002 | Yano et al. | |
| 6,494,557 | B1 |   | 12/2002 | Kato et al. | |
| 6,505,909 | B1 |   | 1/2003 | Kato et al. | |

(Continued)

FOREIGN PATENT DOCUMENTS

| JP | 10-013674 A | 1/1998 |
| JP | 2007-320240 A | 12/2007 |
| JP | 2010-136060 A | 6/2010 |

OTHER PUBLICATIONS

Office Action mailed Apr. 8, 2014, in Japanese Patent Application No. 2010-225749, Japanese Patent Office.

*Primary Examiner* — Geoffrey Mruk
*Assistant Examiner* — Bradley Thies
(74) *Attorney, Agent, or Firm* — Fitzpatrick, Cella, Harper & Scinto

(57) ABSTRACT

In the present invention, a first calculation unit calculates, based on image data obtained by reading with a reading unit a plurality of patches formed on a printing medium by a plurality of nozzle regions constituting nozzle array of a printing head, respective color specification values of a plurality of correction regions corresponding to a plurality of nozzle regions constituting the nozzle array. Then, a target value setting unit sets, based on the calculated color specification values of the plurality of correction regions, a target color specification value of the patch. Further, a second calculation unit calculates a difference between each of the color specification values of the plurality of correction regions and the target color specification value as a correction amount. After that, based on the correction amount calculated, image data corresponding to an image printed by each of the plurality of nozzle regions are corrected.

11 Claims, 17 Drawing Sheets

(56) References Cited

U.S. PATENT DOCUMENTS

| | | |
|---|---|---|
| 6,585,353 B1 | 7/2003 | Kanematsu et al. |
| 6,832,824 B1 * | 12/2004 | Baker et al. .................... 347/19 |
| 7,048,356 B2 | 5/2006 | Ishikawa et al. |
| 7,726,763 B2 * | 6/2010 | Ochiai et al. .................... 347/15 |
| 2005/0237548 A1 * | 10/2005 | Suzuki .......................... 358/1.9 |
| 2009/0040256 A1 * | 2/2009 | Baba et al. ..................... 347/14 |

* cited by examiner

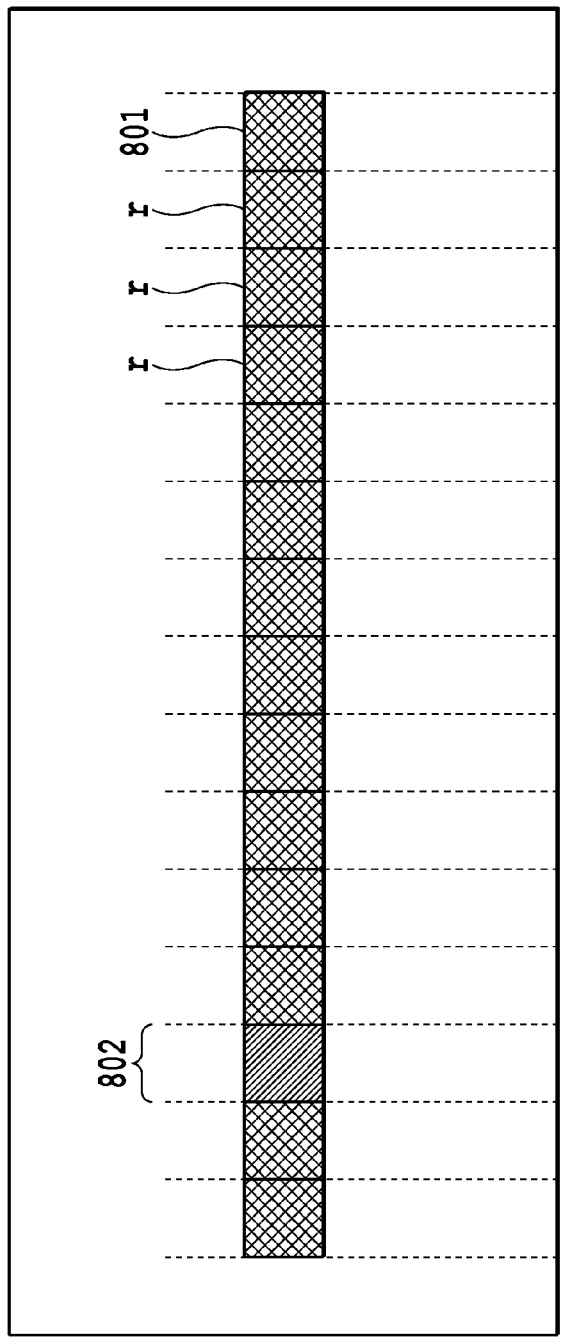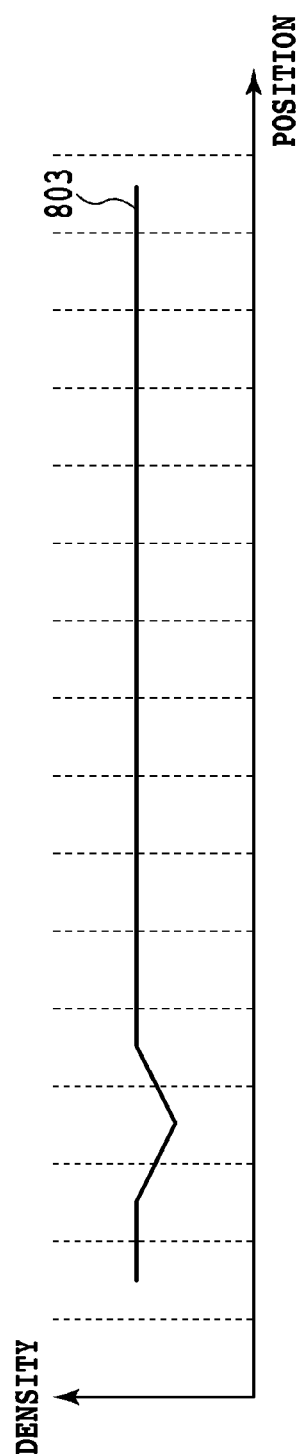
FIG.10A
FIG.10B

INKJET PRINTER AND IMAGE PROCESSOR FOR CORRECTING IMAGE DATA BASED ON COLOR SPECIFICATION VALUES AND A TARGET COLOR SPECIFICATION VALUE

BACKGROUND OF THE INVENTION

1. Field of the Invention

The present invention relates to an inkjet printer, image processor, and image processing method that form an image on a printing medium with use of a printing head having a nozzle array in which a plurality of nozzles ejecting ink are arrayed.

2. Description of the Related Art

A printing head used in an inkjet type printer may include a variation in ejection characteristics (ejection amount, ejecting direction, and the like) among a plurality of nozzles due to manufacturing errors. If there is such a variation, color difference is likely to occur in a printed image.

Conventionally, it is known that, as processing for reducing such density unevenness, a head shading correction technique as disclosed in Japanese Patent Laid-Open No. H10-13674 (1998) is used. The head shading correction technique is a technique that corrects image data according to information on ejection characteristics of each nozzle.

In the correction technique, a pattern for detecting a variation in ejection characteristics among nozzles is formed on a printing medium by a printing head; then a density of the pattern is read with use of a reader such as a scanner; and on the basis of a result of the reading, ejection characteristics of each of the nozzles are detected. Then, according to the detected ejection characteristics of each of the nozzles, the number of ink dots that are finally printed is increased or decreased for each of the nozzles. This enables a density of an image formed by each of the nozzles to be adjusted.

The conventional head shading correction technique as disclosed in the above Japanese Patent Laid-Open No. H10-13674 (1998) is based on the assumption that the reader reading the pattern formed on the printing medium accurately reads the pattern. However, in an actual reader, a variation or error may occur due to a variation, variation with time, temperature characteristics, or the like of a light source. In such a case, in the conventional head shading correction technique including Japanese Patent Laid-Open No. H10-13674 (1998), there arises a problem that an error or variation of a read value influences a correction value in the head shading correction, and therefore color difference of an image due to a variation in ejection characteristics of a nozzle cannot be adequately corrected.

SUMMARY OF THE INVENTION

The present invention is intended to, in correction processing that reduces the occurrence of color difference of an image due to a variation in ejection characteristics among nozzles arrayed in a printing head, reduce an influence due to a read value variation, error, or the like occurring in a reader.

In order to accomplish the above object, an image processor of the present invention is provided with the following configuration.

A first aspect of the present invention is an inkjet printer that uses a printing head provided with a nozzle array in which a plurality of nozzles are arrayed, and ejects ink from the nozzle array to print an image on a printing medium, the inkjet printer comprising: a first calculation unit configured to, on a basis of image data obtained by reading with a reading unit a plurality of patches formed on the printing medium by a plurality of nozzle regions constituting the nozzle array, calculate respective color specification values of a plurality of correction regions corresponding to the plurality of nozzle regions; a target value setting unit configured to, on a basis of the color specification values of the plurality of correction regions, set a target color specification value of the patch; a second calculation unit configured to calculate a difference between each of the color specification values of the plurality of correction regions and the target color specification value as a correction amount; and a correction unit configured to, on a basis of the correction amount calculated by the second calculation unit, correct image data corresponding to an image printed by each of the plurality of nozzle regions.

A second aspect of the present invention is an image processing method that processes image data for printing image on a print medium by ejecting ink from a printing head provided with a nozzle array in which a plurality of nozzles are arrayed, the image processing method comprising: a first calculation step of, on a basis of image data obtained by reading with a reading unit a plurality of patches formed on the printing medium by a plurality of nozzle regions constituting the nozzle array, calculating respective color specification values of a plurality of correction regions corresponding to the plurality of nozzle regions; a target value setting step of, on a basis of the color specification values of the plurality of correction regions, setting a target color specification value of the patch; a second calculation step of calculating a difference between each of the color specification values of the plurality of correction regions and the target color specification value as a correction amount; and a correction step of, on a basis of the correction amount calculated by the second calculation step, correcting image data corresponding to an image printed by each of the plurality of nozzle regions.

According to the present invention, in correction processing that reduces the occurrence of color difference of an image due to a variation in ejection characteristics among nozzles arrayed in a printing head, an influence due to a read value variation, error, or the like occurring in a reader can be reduced.

Further features of the present invention will become apparent from the following description of exemplary embodiments (with reference to the attached drawings).

BRIEF DESCRIPTION OF THE DRAWINGS

FIG. 10A is a diagram illustrating a head shading analysis image;

FIG. 10B is a diagram illustrating a density distribution of a patch illustrated in FIG. 10A;

DESCRIPTION OF THE EMBODIMENTS

Embodiments of the present invention will hereinafter be described in detail with reference to the drawings.

Figure 1:
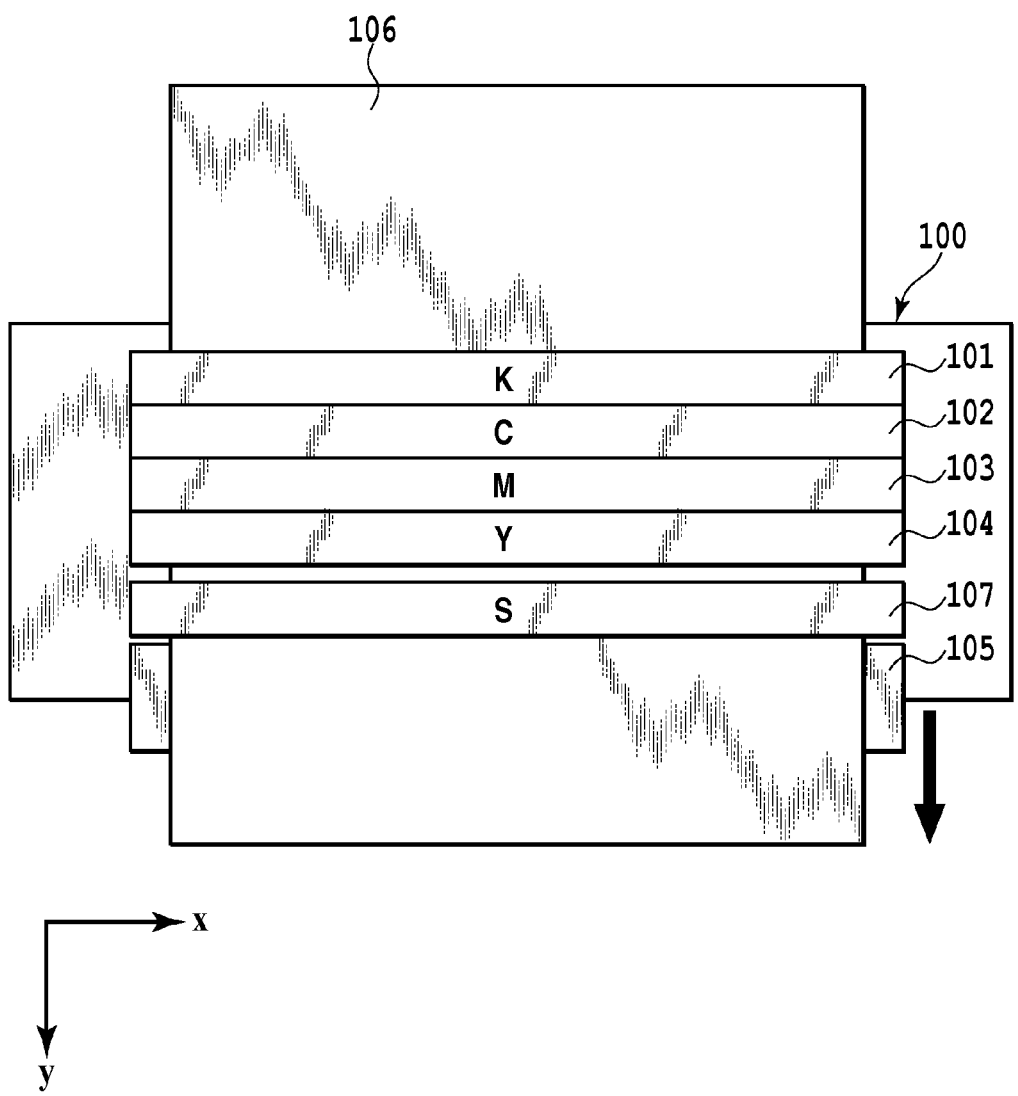
FIG. 1 is a diagram schematically illustrating an inkjet printer according to embodiments of the present invention.

FIG. 1 is a diagram schematically illustrating an inkjet printer (hereinafter also referred to as a printer) according to the embodiments of the present invention. As illustrated in FIG. 1, the printer 100 is provided with printing heads 101 to 104 on a frame serving as a structural material of the printer. Each of the printing heads 101 to 109 is a so-called full-line type one in which a plurality of nozzles for ejecting black (K), cyan (C), magenta (M), or yellow (Y) ink are arrayed along a direction intersecting with a conveying direction of a printing medium. Each of the printing heads has a long nozzle array in which nozzles are arrayed over a maximum width or more of the printing medium to be used, and is therefore also referred to as a long head. A resolution of the nozzle arrangement in the nozzle array of each of the printing heads is 1200 dpi. Also, the printer 100 is provided with a scanner (color information acquiring unit) 107 that acquires color information on an image printed by the printing heads 101 to 104, or the like, in parallel with the printing head 104. Note that the scanner 107 in the embodiments has a resolution of 1200 dpi.

Printing paper 106 as the printing medium is conveyed in a direction indicated by an arrow in the diagram by a conveying roller 105 (and another roller not illustrated in the diagram) that is rotated by driving force of a motor (not illustrated). Also, while the printing paper 106 is conveyed, from the pluralities of nozzles of the respective printing heads 101 to 104, the inks are ejected according to printing data, and thereby one raster images corresponding to the nozzle arrays of the respective printing heads are sequentially printed. By repeating such ink ejection operation of the respective printing heads onto the printing paper that is being conveyed, for example, a one-page image can be printed. Note that the printer applicable with the present invention is not limited to the full-line type printer described above. It is obvious from the following description that the present invention can also be applied to, for example, a so-called serial type printer that scans printing heads in a direction intersecting with a conveying direction of printing paper to perform printing.

Figure 2:
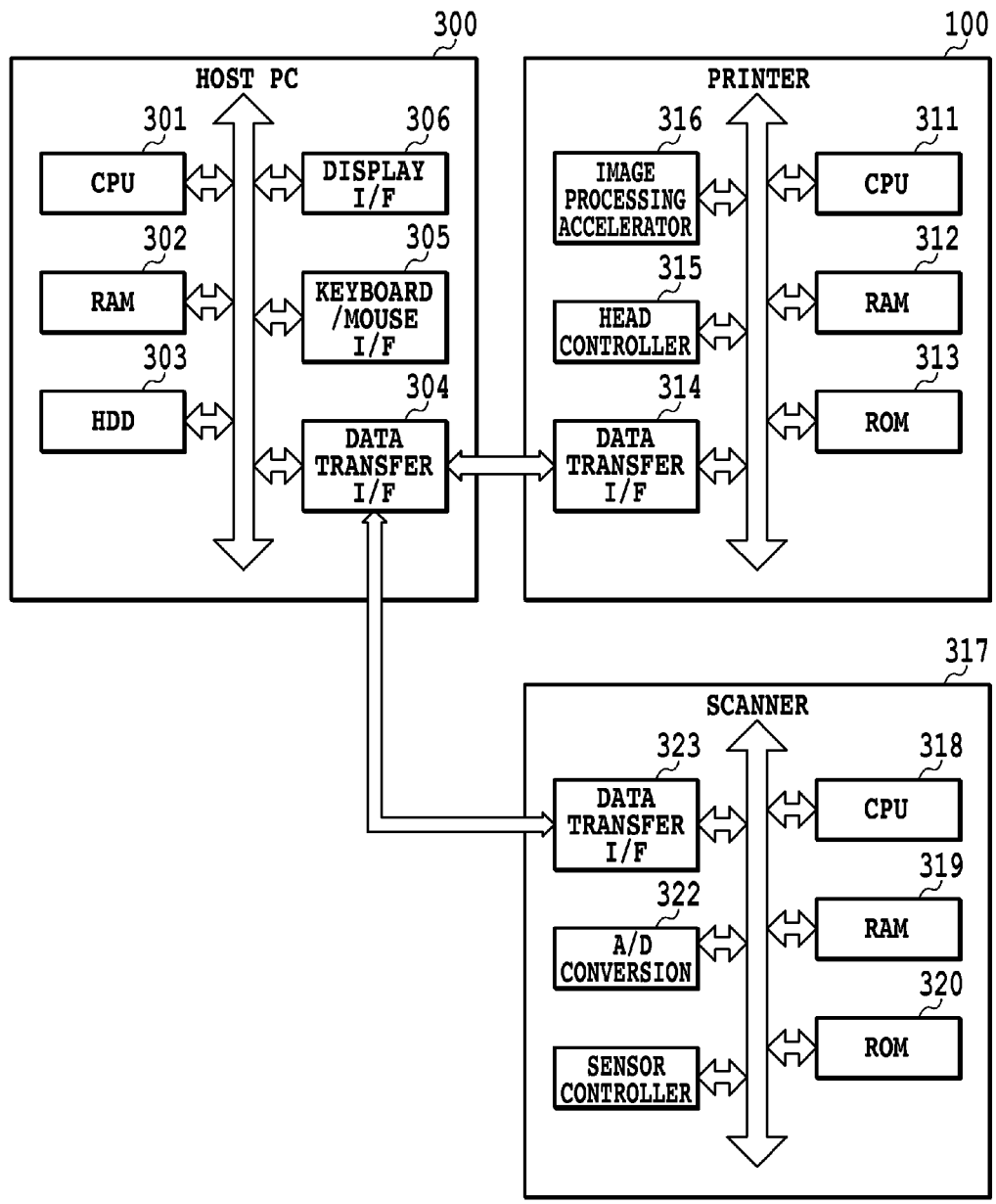
FIG. 2 is a block diagram illustrating a printing system according to the embodiments of the present invention.

FIG. 2 is a block diagram illustrating a printing system according to one embodiment of the present invention. As illustrated in the diagram, the printing system is configured to have the printer 100 illustrated in FIG. 1, a scanner 317, and a host PC 300 that transmits printing data to the printer main body 110, or receives image data from the scanner 317.

The host PC 300 is configured to mainly have the following elements. A CPU 301 performs after-mentioned processing according to a program stored in a hard disk (HDD) 303 or RAM 302 that serves as a storage unit. For example, the CPU 301 functions as a conversion data generation unit and a switching unit that perform an after-mentioned generation step of conversion data, table switching step, and the like. The RAM 302 is a volatile storage, and temporarily stores programs and data. Also, the HDD 303 is a nonvolatile storage, and stores programs and data as well. A data transfer I/F (interface) 304 controls data transmission/reception with the printer 100. As a connecting method for the data transmission/reception, a USB, IEEE 1394, LAN, or the like can be used. A keyboard/mouse I/F 305 is an I/F that controls HIDs (Human Interface Devices) such as a keyboard and mouse, and a user can provide input through the I/F. A display I/F 306 controls a display on a display (not illustrated).

The printer 100 is configured to mainly have the following elements. A CPU 311 performs processing in each embodiment, which is to be described with FIG. 3B and subsequent drawings, according to a program stored in a ROM 313 or RAM 312. The RAM 312 is a volatile storage, and temporarily stores programs and data. Also, the ROM 313 is a nonvolatile storage, and can store table data generated by processing in each embodiment, which is to be described with FIG. 3B and subsequent drawings, and programs.

A data transfer I/F 314 controls data transmission/reception with the PC 300. A head controller 315 supplies printing data to the respective printing heads 101 to 109 illustrated in FIG. 1, and also controls the ejection operation of the printing heads. Specifically, the head controller 315 can be configured to read control parameters and printing data from a predetermined address of the RAM 312. When the CPU 311 writes the control parameters and printing data in the above predetermined address of the RAM 312, the head controller 315 activates processing to perform ink ejection from the printing heads. An image processing accelerator 316 is configured to be hardware, and performs image processing faster than the CPU 311. Specifically, the image processing accelerator 316 can be configured to read parameters and data necessary for the image processing from a predetermined address of the RAM 312. When the CPU 311 writes the parameters and data in the above predetermined address of the RAM 312, the image processing accelerator 316 is activated to perform the predetermined image processing. In the present embodiment, generation processing of table parameters (conversion data) used in an MCS processing section, which is to be described in an embodiment with FIG. 11 and subsequent drawings, is performed on the basis of software by the CPU 311. Also, image processing upon printing, which includes processing by an after-mentioned head shading (HS) processing section and MCS processing section, is performed on the basis of hardware processing by the image processing accelerator 316. Note that the image processing accelerator 316 is not an essential element, and the above generation processing of the table parameters and image processing may be performed only on the basis of processing by the CPU 311, depending on specifications of the printer.

The scanner 317 is configured to mainly have the following elements. A CPU 318 performs processing in each embodiment, which is to be described with FIG. 3B and subsequent drawings, according to a program stored in a ROM 320 or RAM 319. The RAM 319 is a volatile storage, and temporarily stores programs and data. Also, the RAM 320 is a nonvolatile storage, and stores programs and data for performing processing in each embodiment, which is to be described with FIG. 3B and subsequent drawings.

A data transfer I/F 323 transmits/receives data to/from the PC 300. Physical connecting methods include a USB, IEEE 1394, LAN, and the like. A sensor controller 321 is a block that controls a sensor performing reading, and performs sensor timing control, and control of a motor that scans a sensor unit. Also, an A/D conversion 322 converts charges accumulated in the sensor into digital data.

In the following, there are described embodiments that are intended to reduce a color difference such as density unevenness or color unevenness of an image, which occurs due to a variation in ejection characteristics among the nozzles in the nozzle array of each of the printing heads in the printing system described above.

Figure 3A:
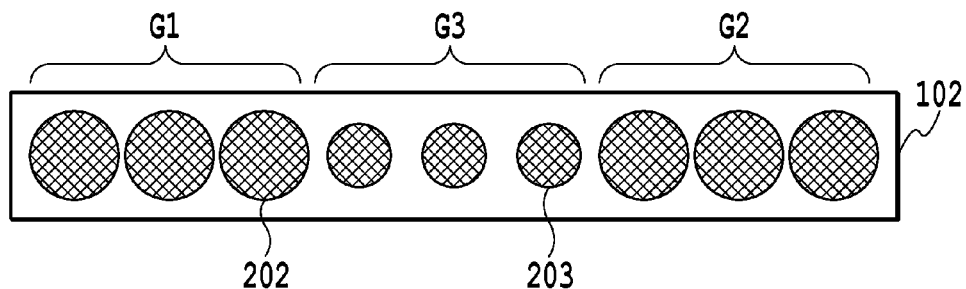
FIG. 3A is a diagram illustrating nozzle regions having different ejection amounts in a printing head.
Figure 3B:
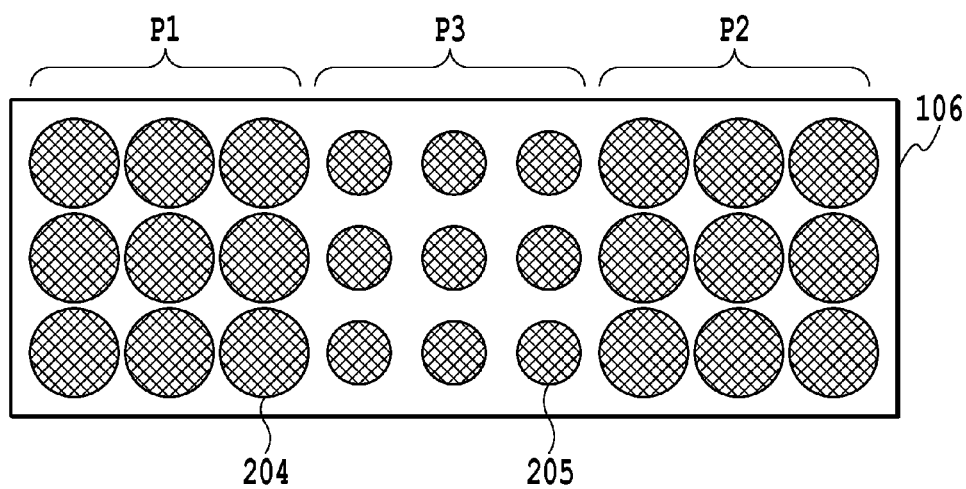
FIG. 3B is a diagram illustrating an image in which color unevenness occurs due to a difference in ejection amount among the respective nozzle regions illustrated in FIG. 3A.

FIGS. 3A and 3B are diagrams for describing the occurrence of color unevenness that occurs due to a difference in ejection amount in a printing head. It is assumed that the printing head 102 illustrated in FIG. 3A is configured to have: nozzle regions G1 and G2 having standard nozzles 202 each having substantially the same ejection amount as a standard ejection amount upon manufacturing; and a nozzle region G3 having nozzles 203 each manufactured so as to have a smaller ejection amount than the standard one. When an image is printed by such a printing head 102, on the printing medium 106, standard sized dots (standard dots) 204 and small sized dots (small dots) 205 are formed. When the image formed on the printing medium 106 is macroscopically viewed, a region P3 formed with the small dots 205 is lightly viewed as compared with the other regions P1 and P2. That is, the region formed with the small dots 205 is viewed as color difference (density unevenness).

Figure 4:
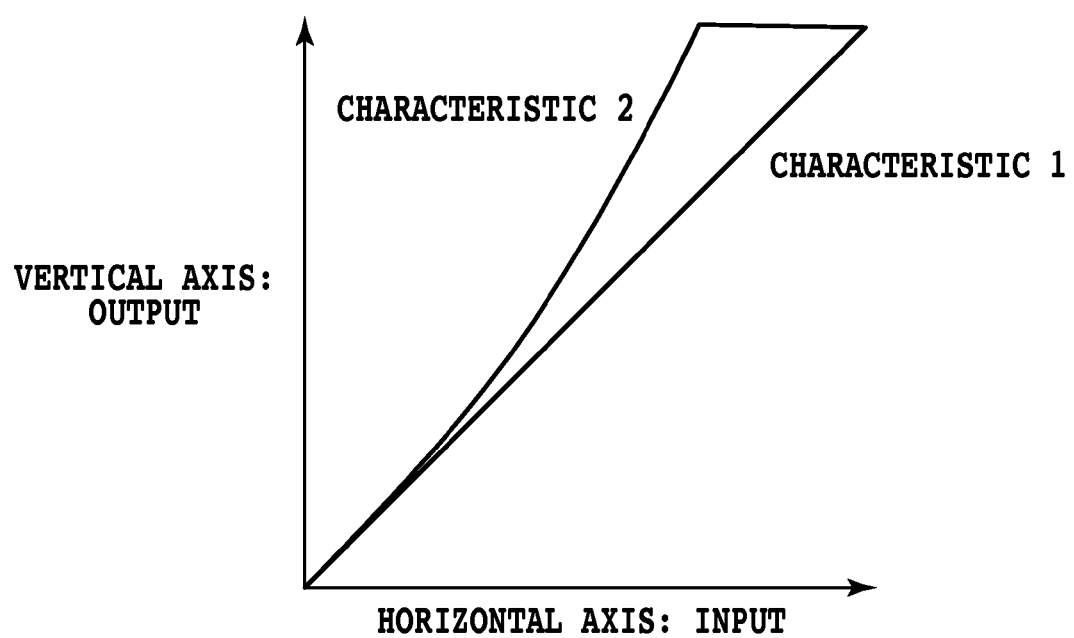
FIG. 4 is a diagram illustrating a density correction table in head shading in the present embodiment.

In order to correct the color difference, head shading correction processing is performed. In the head shading correction processing, first, patches for correction printed on the printing medium 106 are read with a reader such as a scanner, and a read value for each of the nozzle regions is calculated. Then, depending on the calculated read value, a density correction amount is calculated, and upon printing, the density correction amount is applied to thereby perform head shading. The region P3 illustrated in FIG. 3B, which is formed with the small dots 205, is read by the scanner as a lower density region than the regions P1 and P2 formed with the standard dots 204. For the region P2 read as the lower density region, a density correction table corresponding to a read value from the region P2 is selected. For example, for the lower density region P3 formed with the small dots by the small nozzles 203, a correction table that increases a density, as Characteristic 2 illustrated in FIG. 4, is applied.

Figure 5A:
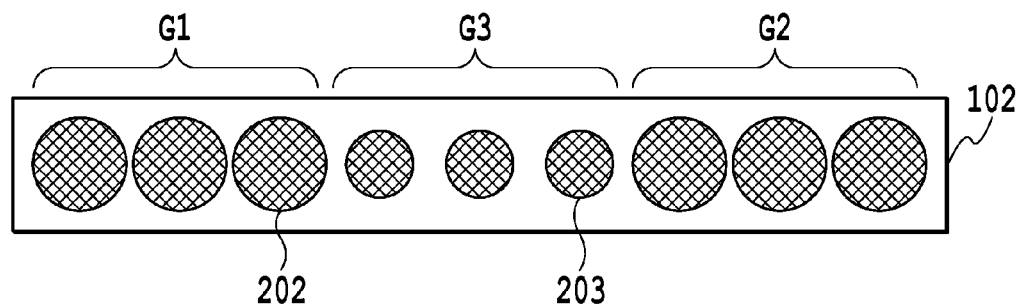
FIG. 5A is a diagram illustrating nozzle regions having different ejection amounts in a printing head.
Figure 5B:
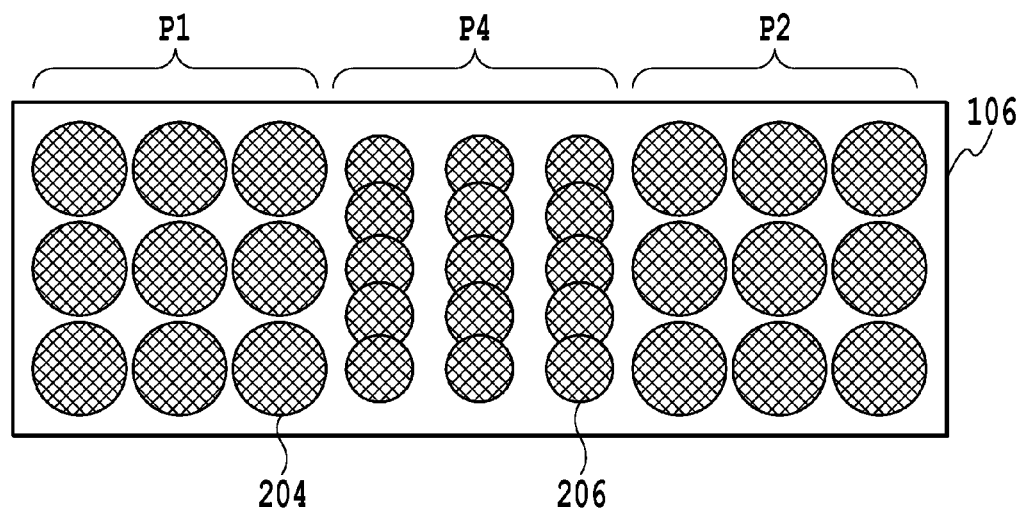
FIG. 5B illustrates an image obtained by applying the density correction table to correct image data corresponding to the image illustrated in FIG. 3B.

FIG. 5B illustrates an image that is obtained by applying the density correction table to correct image data corresponding to the image illustrated in FIG. 3B. Image data printed with the small nozzles 203 as illustrated in FIG. 5A are applied with a correction table that increases a density of an image, and therefore on the basis of the corrected image data, in a region P4 formed with small dots 206, a number of dots are formed. As a result, when the formed image is macroscopically viewed, the regions P1 and P2 formed with the standard dots 204 and the region P4 formed with the small dots 206 printed on the basis of the corrected image data are viewed as having the same density. As described, even if a variation in ejection characteristics between the nozzles occurs, by making the head shading correction, a density of an image to be printed can be uniformized. Note that, in order to adequately perform the head shading correction processing, it is assumed that the scanner can adequately read the patches for correction. However, in practice, a read error may occur in the scanner, and due to the influence of the read error, the adequate head shading correction may not be made.

Figure 6:
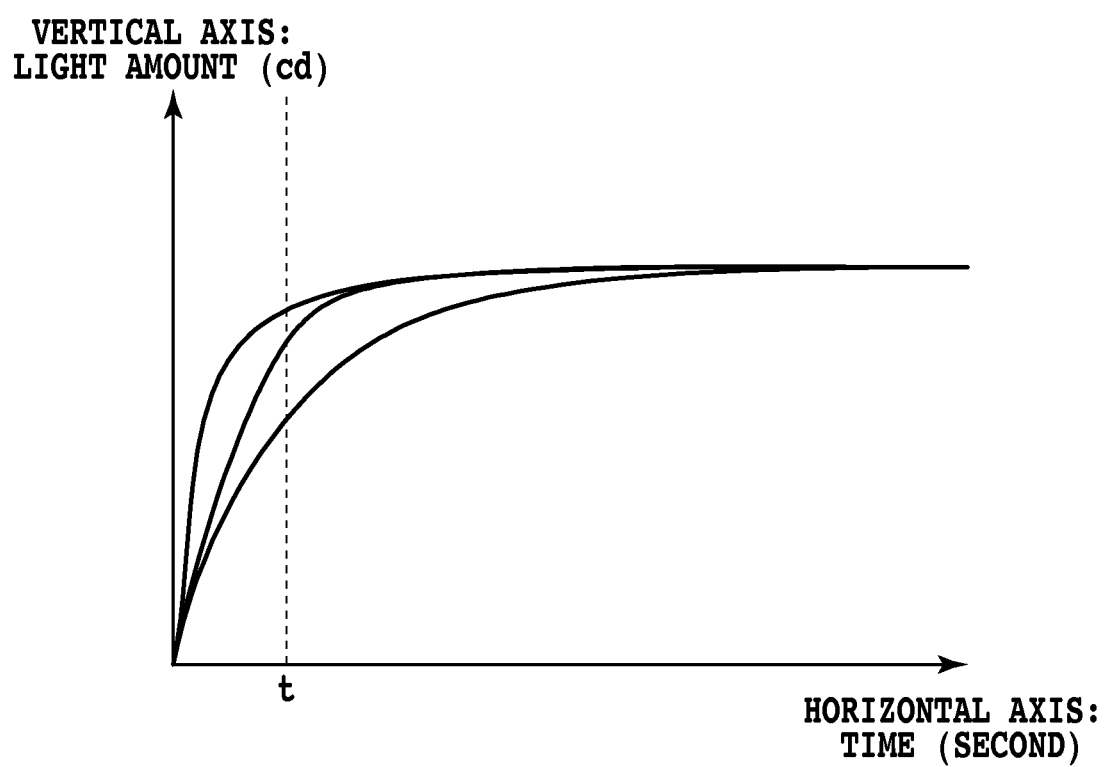
FIG. 6 is a diagram illustrating a rise characteristic of a light amount of a scanner light source in the present embodiment.

For example, in the case of using a scanner to analyze an image printed on a printing medium, as a reading light source of the scanner, a cold cathode fluorescent lamp (CCFL) is generally used. In the CCFL, a phosphor emits light, and therefore it takes time before a light amount stabilizes since the activation of a power supply for the light source. FIG. 6 illustrates a rise characteristic of the light amount. The rise characteristic of the light amount as illustrated in FIG. 6 is varied depending on an ambient temperature or the like. Even if reading is performed at predetermined certain timing t after the power supply for the light source has been turned on, the light amount is varied depending on an ambient temperature or the like, and therefore it is difficult to correct the light amount on the basis of time. In order to prevent the reading from being performed in an unstable region of the light source, the reading is performed after a time of a few tens of seconds to a few minutes has passed. However, in such a case, a time from the start of the reading to the end of the analysis is added with a stabilization time of the light source, and therefore a large time cost is required for the head shading correction processing.

In the case of using the scanner for the analysis, before reading, calibration of the scanner is performed. The scanner calibration is processing that reads a white reference plate with the scanner and makes a correction to uniformize read white levels of respective pixels. Accordingly, if a white level of the white reference plate is varied due to variation with time, contamination, dust, or the like, the white level is corrected to an inadequate value, and therefore the read value is varied. If the read value is varied upon head shading analysis as described, correspondingly, a correction amount is also varies, and therefore image data cannot be adequately corrected.

Figure 7:
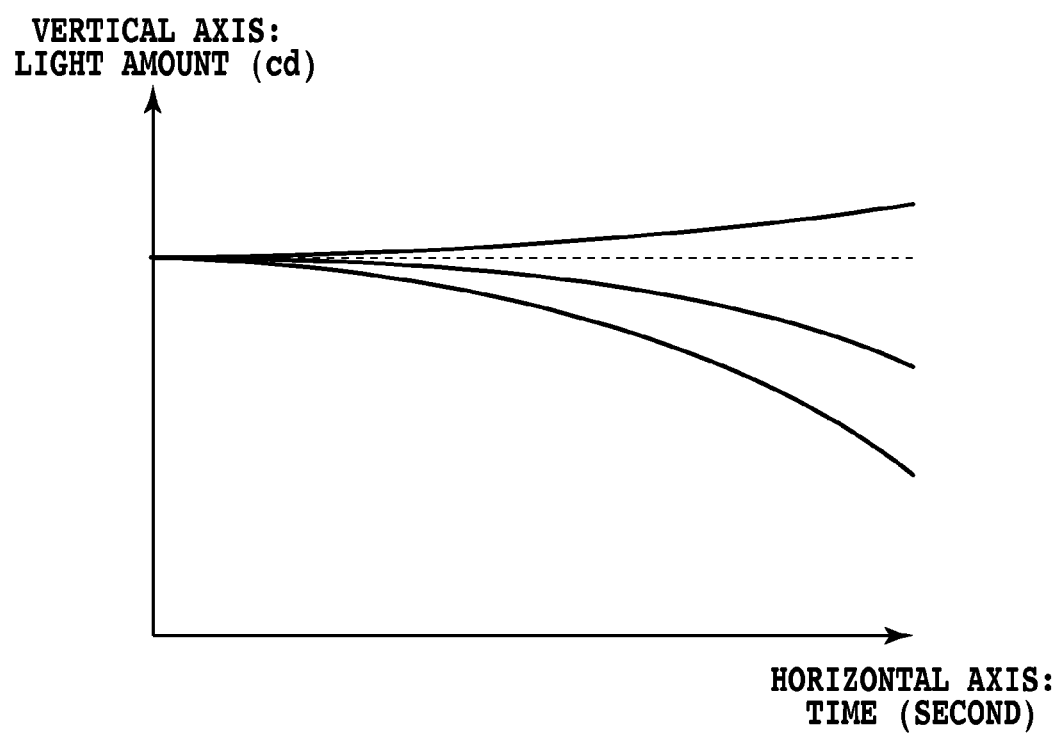
FIG. 7 is a diagram illustrating a light amount variation characteristic of the light source during reading operation by the scanner.

Also, even while an original is read with the scanner, the light amount may be varied due to thermal fluctuation, which may causes a read value to be varied. For example, when the light source of the scanner emits light, heat is generated as in a cathode of a cold cathode tube. There is a phenomenon in which when heat is generated, the phosphor is influenced by the heat, and the light amount of the light source is decreased. Also, in the case where the scanner scans and reads an image, an air flow is generated around the scanner by the movement of the scanner. When the air flow is generated as described, heat of the light source is taken to decrease a temperature of the light emitter, and thereby the light amount may increase. Such a light amount variation during reading is illustrated in FIG. 7. Regarding the light amount variation as described here, a variation characteristic of the light amount is varied by an ambient temperature, and therefore it is difficult to correct the characteristic. When the read value is varied due to a decrease in light amount during reading as described, the correction amount is also varied correspondingly, and therefore an adequate correction cannot be made.

In the following embodiments according to the present invention, without being influenced by a read error or variation of a scanner as described above, correction processing of image data can be achieved with an adequate correction amount.

Figure 9:
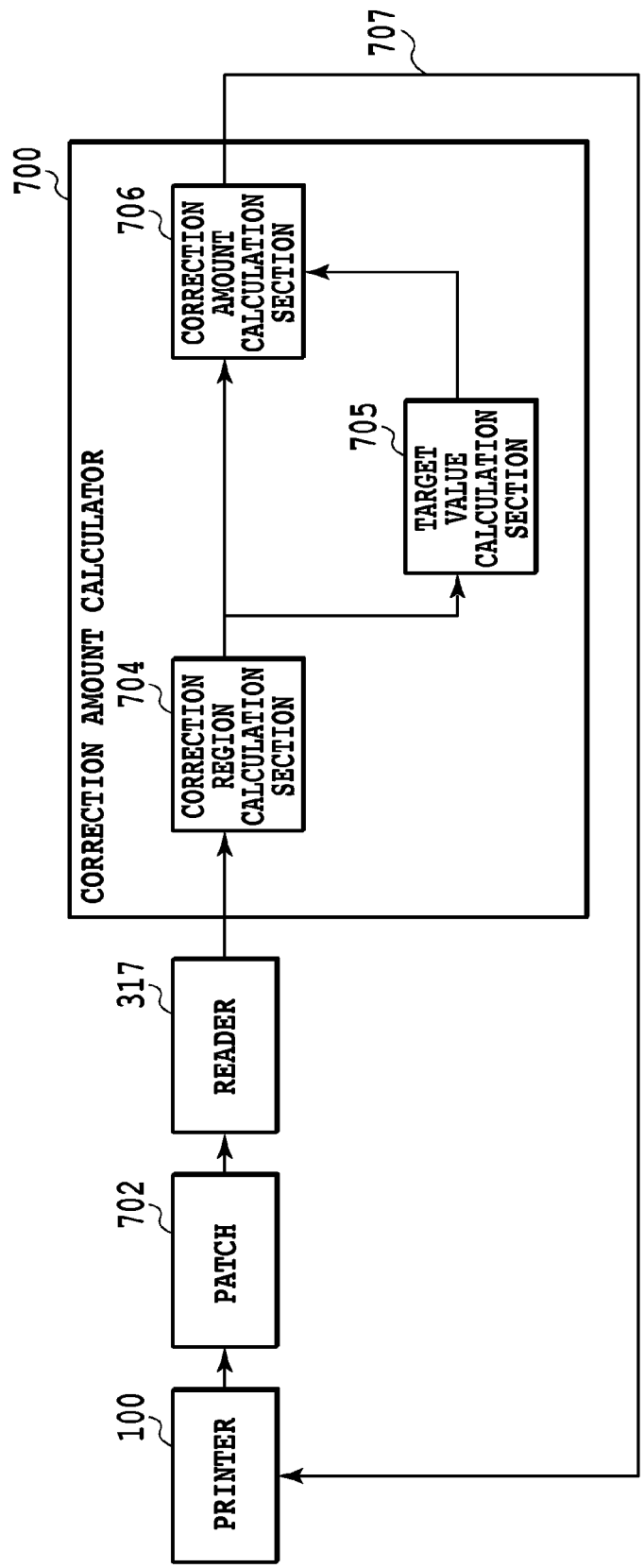
FIG. 9 is a block diagram illustrating a configuration of a correction amount calculation section in the printing system of the present embodiment.

FIG. 9 is a block diagram illustrating a configuration of a correction amount calculation section in the printing system of the present embodiment.

The printer main body 100 is provided with the above-described input section 401, image processing section 402, output section 409, and the like. The printer 100 prints patches used for a predetermined head shading correction on a printing medium. In the present embodiment, the four printing heads are provided corresponding to the plurality of types of inks (K, C, M, and Y inks) used for the printer main body 100, and therefore sets of patches respectively having the four colors are formed by the respective printing heads. In the present embodiment, for example, a patch 801 having a pattern as illustrated in FIG. 10A is formed by the respective printing heads. Note that, in FIG. 10A, the one patch 801 is formed by the nozzle arrays provided in the respective printing heads. A plurality of regions r that are sectioned by dashed lines in FIG. 10A refer to correction regions each of which is set as an after-mentioned correction processing unit. Each of the correction regions corresponds to a nozzle region defined in the nozzle array of each of the printing heads, and in each nozzle region, a predetermined number of nozzles are arrayed. Note that a patch 702 outputted with use of the respective inks is read by a reader (reading unit) 703, from which image data corresponding to each patch 702 are outputted. As the reader 703 in the present embodiment, the scanner illustrated in FIGS. 1 and 2 is used; however, a colorimeter or another device similar to the colorimeter can also be used. The image data obtained on the basis of the reading by the reader 703 are passed to a correction amount calculator 700. The correction amount calculator 700 is provided with a correction region calculation section (first calculation unit) 704, target value calculation section (target value setting unit) 705, and correction amount calculation section (second calculation unit) 706. These calculation sections perform calculation processing as described below to thereby output a correction amount 707 used for the head shading correction.

Figure 11:
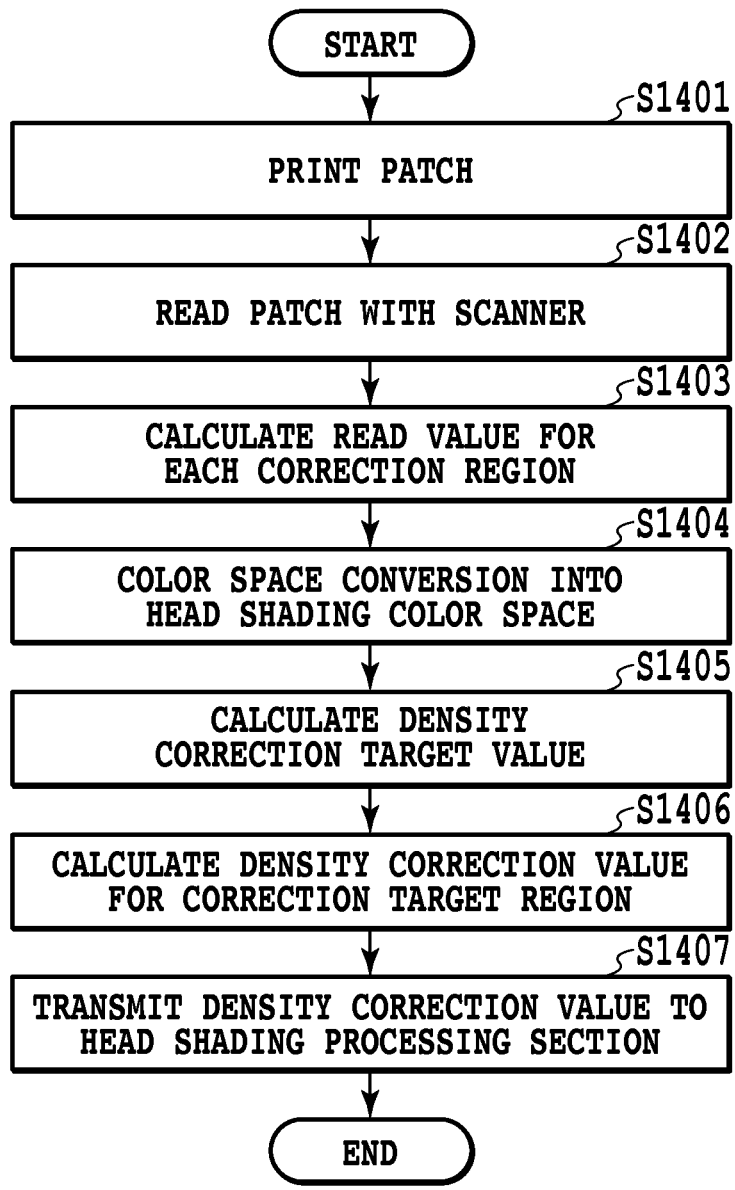
FIG. 11 is a flowchart illustrating a procedure of head shading correction processing in the first embodiment.

Next, a method for the above-described correction amount calculation is described in detail with use of a flowchart illustrated in FIG. 11.

In Step S1401, the printer 100 prints the patch 801 having a pattern as illustrated in FIG. 10A. In the following embodiment, the case where the head shading correction processing is performed upon printing of a cyan ink that is a primary color ink is taken as an example to provide a description. If in the plurality of nozzle regions set in the cyan head 102, a nozzle region having a different ink ejection amount is present, a correction region 802 in which color difference (density difference) from the other correction regions occurs is formed in the patch. This is recognized as density unevenness within the patch, and therefore the processing for correcting the density unevenness is performed in the following manner.

In Step S1402, the color patch 801 is read by the scanner 703, and image data are outputted to the correction region calculation section 704 of the correction amount calculator 700. In Step S1403, the correction region calculation section 704 quantifies, on the basis of the image data outputted from the scanner 703, values of the respective correction regions of the color patch. In this case, for each of the correction regions r that are sectioned by the dashed lines in FIGS. 10A and 10B, a value obtained by averaging density values of each of R, G, and B components read by the pixels of the scanner 703 is outputted. The values of the respective color components that represent a color corresponding to each of the nozzle regions are referred to as region average values.

In Step S1404, a color represented by each of the sets of region average values obtained in the previous step S1403 is converted to a color expressed in the CMYK color space that is a color space for performing the head shading correction processing. Methods for the color space conversion include a method using matrix calculation, method using a lookup table, and the like. Also, in the present embodiment, as the color space for performing the head shading correction processing, the CMYK color space having a density value range of 0 to 255 is employed. Accordingly, values of the respective color components (C, M, Y, K) of a color expressed in the CMYK color space are respectively represented by 8-bit signals.

In Step S1405, the target value calculation section 705 calculates a target density value (hereinafter simply referred to as a target value) that is a target color specification value for correcting a color difference (density difference) in each of the correction regions due to a variation in ejection characteristics of a nozzle. In the first embodiment, on the basis of the sets of region average values of the respective nozzle regions, which are outputted from the correction region calculation section 704, an average density value of a color of the entire patch is obtained, and the average density value is set as the target value for correcting a density value of each of the correction regions. Specifically, the target value is calculated in the following manner. Note that the color specification value here refers to information on a color represented by coordinate values in a color space. The color specification value in the present embodiment refers to a gradation value (density value) of each of the C, M, Y, and K colors.

It is now assumed that the region average value of the color space converted cyan density has a density distribution as illustrated in FIG. 10B. It is also assumed that a density of the correction region 802 where the density unevenness occurs has a lower density value than the other correction regions, and the correction regions where no density unevenness occurs have a constant value. It is now further assumed that the region average density value of cyan in the correction region 802 where the density unevenness occurs is a value of (195), and the region average density values of cyan in the other 14 correction regions are respectively values of (200). In this case, an average value of the region average densities of the entire patch is obtained by Expression (1):

$$(195+200\times14)/15=200 \qquad (1)$$

Accordingly, the target density value is set to 200.

Then, in Step S1406, the correction amount calculation section 706 uses the color space converted region average values and the target value calculated in the target value calculation section 705 to calculate density correction values (correction amounts). Specifically, by subtracting the color space converted region average values from the target value, the correction amounts are obtained. Accordingly, the correction amount for the correction region 802 where the density unevenness occurs is calculated by Expression (2):

$$200-195=5 \qquad (2)$$

In the same manner, the correction amounts for all of the other correction regions are also obtained. That is, the correction amounts for the other correction regions are calculated by Expression (3):

$$200-200=0 \quad (3)$$

From the above, regarding image data corresponding to the correction region 802, the cyan density value is increased by the correction amount of 5, whereas regarding image data corresponding to each of the other correction regions, the cyan density is changed by the correction amount of 0, i.e., the cyan density in the image data is not corrected. Based on this, the cyan density of the image to be printed can be uniformized.

In Step S1407, the correction amounts 707 calculated in the correction amount calculator 700 are sent to the head shading processing section 406 of the printer 100, where the head shading correction processing of the image data is performed according to the correction amounts 707. In addition, the above correction processing is also performed on each of magenta, yellow, and black patches in the same manner.

As described above, in the first embodiment, the target value is calculated on the basis of the region average values, and by subtracting the respective region average values from the target value, the correction amounts in the head shading are calculated. For this reason, if an error or variation occurs in a read value (hereinafter referred to as a read error) due to a variation, variation with time, or temperature characteristics of the light source of the scanner, the read error of the scanner will be included in all of the target value and the respective region average values. Accordingly, by obtaining the correction amounts by subtracting the respective region average values from the target value, the read error included in the target value and the read error included in each of the region average values are cancelled out by each other, and therefore each of the correction amounts has a value representing density unevenness in each of the correction regions, which is caused by a variation in ejection performance of a nozzle. For this reason, by using the correction amounts to perform the head shading correction, an influence of the read error of the scanner can be reduced to achieve a highly accurate density correction.

Note that, in the present invention, there is described the processing that sets the average value of the entire patch as the target value by obtaining the average value of the region average values in the respective correction regions of the patch. However, the setting of the target value is not limited to the method as described above, but a maximum or minimum value among the region average values of the respective correction regions can also be set as the target value. For example, in FIG. 10B, the maximum value among the respective region average values can be set to the region average value of the correction region 802 where the density unevenness occurs, and the region average value of the region 802 where the density unevenness occurs can also be set as the target value to calculate the correction amounts.

For example, it is assumed that the region average value of the region 802 where the density unevenness occurs is a value of (205), and the region average values of the other 14 regions are respectively values of (200). In this case, the correction amount of the density unevenness region 802 is calculated by Expression (4):

$$205-205=0 \quad (4)$$

In the same manner, the correction amounts for the other correction regions are calculated by Expression (5):

$$205-200=5 \quad (5)$$

In this case, the correction region 802 where the density unevenness occurs is not corrected, but the other correction regions are formed with a lower density by the correction amounts of 5. Based on this, without being influenced by a variation in read value by the reader, the occurrence of density unevenness due to a variation in ejection amount of a nozzle can be suppressed.

Also, in the case of setting the minimum value among the region average values of the respective correction regions as the target value, it is only necessary that a correction amount for a correction region indicating the minimum value is set to 0, whereas for the other correction regions, differences between region average values of the other correction regions and the target value are calculated and set as correction amounts, and an image is formed with lower densities by the correction amounts. Based on this, an influence due to a variation in read value by the reader can be reduced, and density unevenness caused by a variation in ejection amount of a nozzle can be suppressed from occurring.

Also, a method for using the region average values of the respective correction regions to set the target value is not limited to any of the methods that respectively set the average, maximum, and minimum value among all of the region average values as the target value as described above. For example, among the color specification values of the plurality of correction regions, color specification values having a distance exceeding a certain distance from a predetermined color specification value in the color space may be removed to set the above-described target color specification value. Specifically, the method is configured such that a certain density is set as a threshold value for a region average value of each of the correction regions, and region average values equal to or more than the threshold value are not used for obtaining the region average value (target value) of the entire patch. This calculation method is effective in the case of, at the time of reading by the reader, unexpectedly reading dirt and dust to largely vary a read value, or other case. That is, according to this method, a region average value including a large noise component that occurs due to an unexpected factor that prevents the reader from performing adequate reading can be eliminated from the target value calculation to thereby set a more adequate target value. For this reason, a more highly accurate head shading correction can be made.

Also, according to the present embodiment, it is not necessary to wait for a time for the scanner light source to stabilize, and therefore a time from the start of reading to the head shading processing can be reduced to improve throughput. Further, the present embodiment is not influenced by a time variation of the white reference plate for the scanner, and therefore a part replacement cycle of the white reference plate due to the time variation can be elongated. Still further, the present embodiment is not influenced by a variation in light amount during reading, and therefore reading can be performed with accuracy even in the case of reading over a wide range.

Second Embodiment

Next, a second embodiment of the present invention is described.

The above-described first embodiment is preferable in the case of correcting density unevenness of a single color image caused by a variation in ejection characteristics of an ink of each of the cyan, magenta, yellow, and black heads. However, in the case of using a plurality of different types of inks to form an image having a mixed color (multi-order color), even if the head shading as described above is performed, the occurrence of color unevenness in the mixed color may not be resolved. In the second embodiment, density unevenness occurring in a multi-order color image is resolved.

Figure 12A:
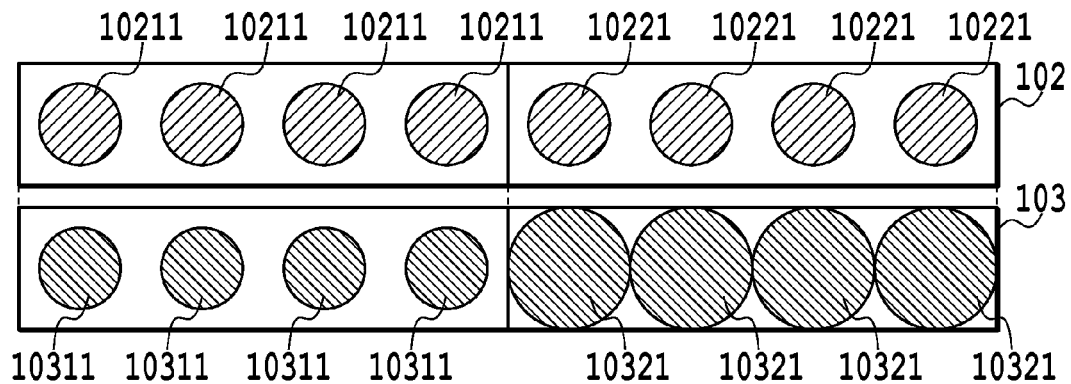
FIGS. 12A to 12C are diagrams illustrating the occurrence of color unevenness of blue, which cannot be resolved even if head shading processing is performed.
Figure 12B:
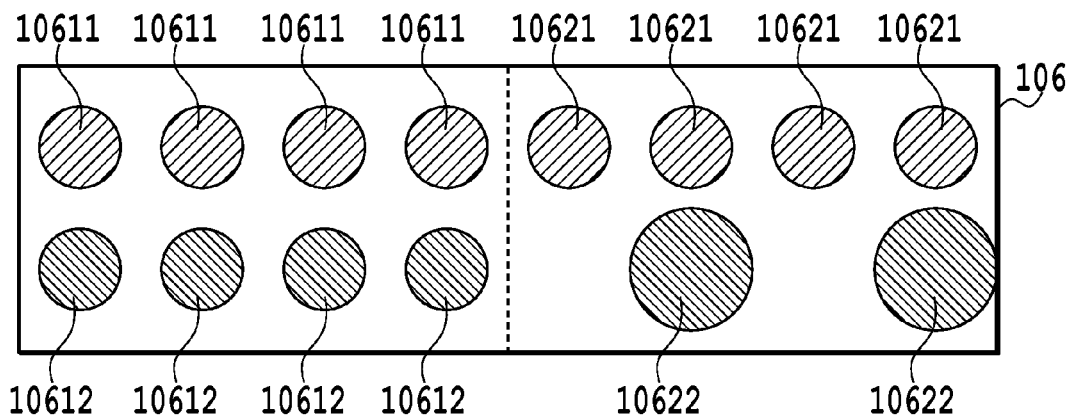
Figure 12C:
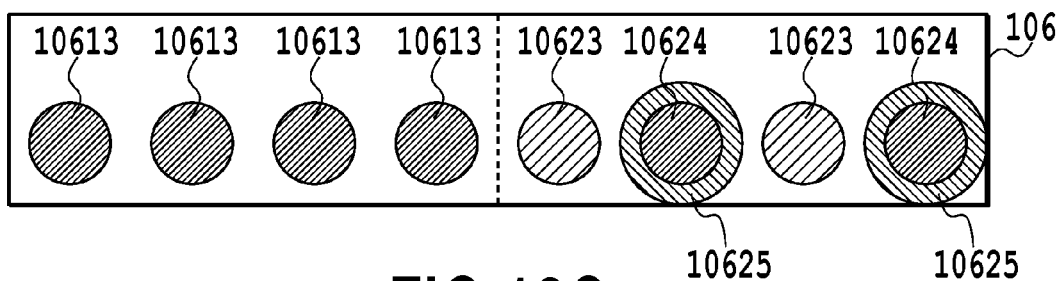

FIGS. 12A to 12C are diagrams for describing the occurrence of color unevenness in a blue image, which is not resolved even if head shading processing based on cyan and magenta heads is performed. Note that a printer 100 uses four heads as described above, i.e., cyan, magenta, yellow, and black heads; however, here, the case of forming an image with the two printing heads of cyan and magenta is taken as an example to provide a description.

In FIG. 12A, Reference numerals 102 and 103 respectively represent the printing heads ejecting cyan and magenta inks. In the diagram, in order to simplify the description and illustration, among a plurality of nozzles arrayed in each of nozzle arrays in the printing heads, i.e., in each of a first nozzle array ejecting the cyan ink and a second nozzle array ejecting the magenta ink, only 8 nozzles are illustrated. Also, in order to describe color difference occurring in the case of using the cyan and magenta inks to print a blue that is a secondary color, only the two printing heads of cyan and magenta are illustrated.

All of the 8 nozzles 10211 and 10221 of the cyan ink printing head 102 can eject the ink having a standard amount in a standard direction, and print dots having the same size on a printing medium at regular intervals. On the other hand, in the case of the 8 nozzles of the magenta printing head 103, it is assumed that an ejecting direction is also the standard one for all of them, and 4 nozzles 10311 on the left hand side of the diagram have the standard ejection amount, whereas 9 nozzles 10321 on the right hand side have a larger ejection amount than the standard one. Accordingly, in a region on the left hand side of the diagram, magenta dots having the same size as the cyan dots are printed, whereas in a region on the right hand side, magenta dots larger than the cyan dots are printed at the same regular intervals as those for the cyan dots.

In the case of using the printing heads having such ejection amount characteristics, if image data are corrected on the basis of the head shading correction, image data corresponding to the magenta nozzles 10321 are corrected to make a further reduction. As a result, dot data (binary data) that set dot printing (1) or dot non-printing (0) are generated so as to suppress the number of dots finally printed by the magenta nozzles 10321 to be smaller than the number of dots printed by the magenta nozzles 10311.

FIG. 12B is a diagram illustrating a dot printing state for the case of performing printing on the basis of the dot data obtained as a result of performing the head shading correction of solid images, i.e., cyan and magenta image data having 100% duty for both. Here, for descriptive purpose, cyan dots and magenta dots are illustrated without being overlapped. In FIG. 12B, Reference numeral 10611 represents dots printed on printing paper by the cyan nozzles 10211, and 10621 represents dots printed on the printing paper by the cyan nozzles 10221. Also, Reference numeral 10612 represents dots printed on the printing paper by the magenta nozzles 10311, and 10622 represents dots printed on the printing paper by the magenta nozzles 10321. Note that, in FIGS. 12A to 12C, a size of each of the nozzles and a size of a dot printed by the nozzle are illustrated with having the same size; however, this is to relate both to each other for descriptive purpose, and these sizes are not the same in practice.

FIG. 12B illustrates the case where a dot area formed on the printing paper by the magenta nozzle 10321 is twice as large as a dot area formed by the magenta nozzle 10311. In this case, if the number of ejections by the magenta nozzles 10321 is reduced to approximately ½ (4 dots→2 dots) of the number of ejections by the magenta nozzles 10311, the cover areas of magenta on the printing paper can be made substantially the same. Note that reducing the number of the dots having the double area to ½ as described above is to simplify the description of the present example. In practice, a relationship between a cover area and a density to be detected is not necessarily proportional. Accordingly, typical head shading is adapted to adjust the number of dots to be printed in each of regions to the extent that densities to be detected in all of the regions are made substantially the same.

FIG. 12C is a diagram illustrating a printing state where the result of performing the printing on the basis of the dot data obtained by the head shading correction is illustrated with the cyan dots and magenta dots being overlapped. In FIG. 12C, in a region on the left hand side of the diagram, the standard sized cyan dots and magenta dots are printed with being overlapped, and thereby standard sized blue dots 10613 are formed. On the other hand, in a region on the right hand side of the diagram, the standard sized cyan dots 10623, and blue dots formed with the standard sized cyan dots and the double sized magenta dots being overlapped are mixed. Further, the blue dot formed with the standard sized cyan dot and the double sized magenta dot being overlapped can be classified into a blue part 10624 where the cyan and the magenta are completely overlapped, and a magenta part 10625 surrounding the blue part 10624.

In the head shading correction, the number of dots to be printed is adjusted to meet the sum of areas of the cyan parts (dots) 10623=the sum of areas of blue parts 10624=the sum of areas of the magenta part 10625. Accordingly, if a color observed on the basis of the sum of optical absorption characteristics of the cyan part 10623 and magenta part 10625 is the same as a color observed on the basis of an optical absorption characteristic of the blue part 10624, the region can be viewed as having substantially the same color as the blue part 10624. As a result, on the printing paper 106, the blue images in the left hand side region of the diagram and the blue images in the right hand side region of the diagram can be viewed as having the same color.

However, in the case of forming a multi-order color by overlapping a plurality of different inks as in the blue part 10624, a color observed on the basis of an optical absorption characteristic of a part formed with the multi-order color is not necessarily identical to a color observed as the sum of optical absorption characteristics of parts respectively formed with the plurality of inks. As a result, the blue images in the left hand side region of the diagram and the blue images in the right hand side region of the diagram are recognized as having different colors (color difference).

In addition, even in a multi-value printer that can change a size of a dot, such as a four-value printer that performs printing with three sized dots, i.e., large, medium, and small dots, a variation may occur in a size of a dot having each size due to a variation in ejection amount among nozzles. In this case, even if the conventional head shading correction is made, color difference may occur for the same reason as the above. Accordingly, without limitation to a two-value printer, even in the multi-value printer using three or more values, by performing MCS correction processing to be described below, the occurrence of color difference can be resolved.

Figure 13:
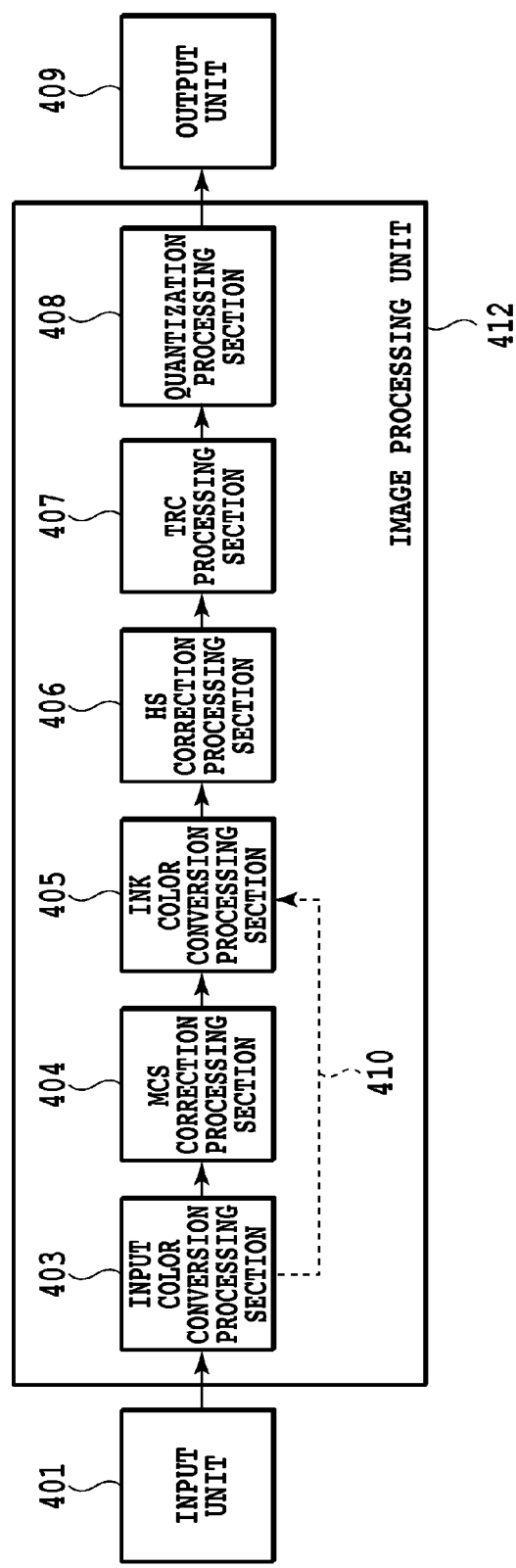
FIG. 13 is a block diagram illustrating a configuration of an image processing section in the inkjet printer according to a second embodiment.

Here, a configuration of an image processing section of the second embodiment is described on the basis of FIG. 13. The image processing section 412 illustrated here is configured to have an input color conversion processing section 403, MCS correction processing section 404, ink color conversion processing section 405, HS processing section 906, TRC processing section 407, and quantization processing section 408.

Figure 8:
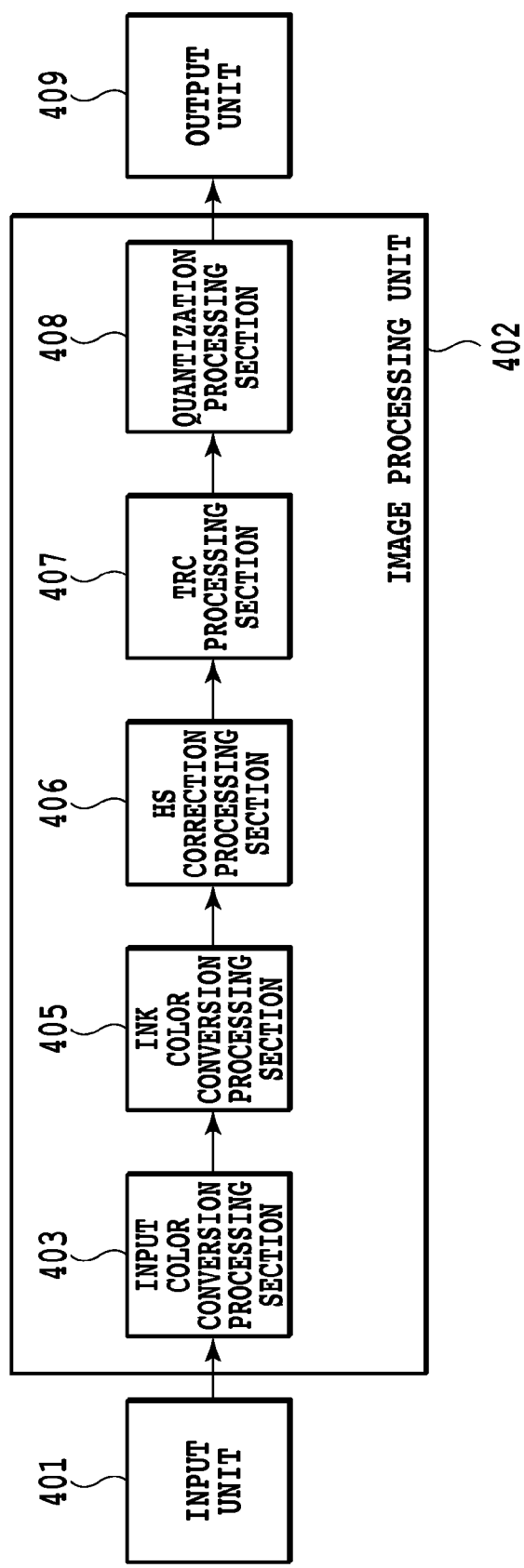
FIG. 8 is a block diagram illustrating a configuration of an image processing section in the inkjet printer according to a first embodiment.

A main difference of the image processing section 412 from the image processing section 402 (see FIG. 8) described in the above first embodiment is that the MCS (Multi Color Shading) correction processing section 404 is provided. The rest of the configuration is the same as that described in the above first embodiment, and therefore the description here is provided with focusing on the MCS correction processing section 404.

The MCS correction processing section 404 performs conversion processing that corrects a difference in color (color difference) on image data to which conversion is performed by the input color conversion processing section 403. In this processing, patches having a multi-order color such as a secondary color or tertiary color are printed; the printed patches are read with a reader such as a scanner; a difference in color (color difference) among the patches is obtained on the basis of data obtained by the reading; and image data are corrected on the basis of the color difference. The MCS processing is performed with use of a conversion table (parameter generation unit) based on a three-dimension lookup table. Based on the conversion processing, even if, in an output section 409, there is a variation in ejection characteristics among nozzles of a printing head, which perform printing in the same region, a color difference due to the variation in ejection characteristics among the nozzles can be reduced unless a read error by the scanner occurs. In the second embodiment, on the basis of a method such as well known matrix calculation processing, or three-dimensional lookup table processing, the conversion to device color image data having 12 bits for each of three elements corresponding to a color signal including the three elements is performed. Image data having 8 bits for each of R', G', and B' obtained by the correction in the MCS correction processing section 404 are converted, by the ink color conversion processing section 405 in the subsequent stage, to image data based on color signal data for inks used in the printer.

Figure 14:
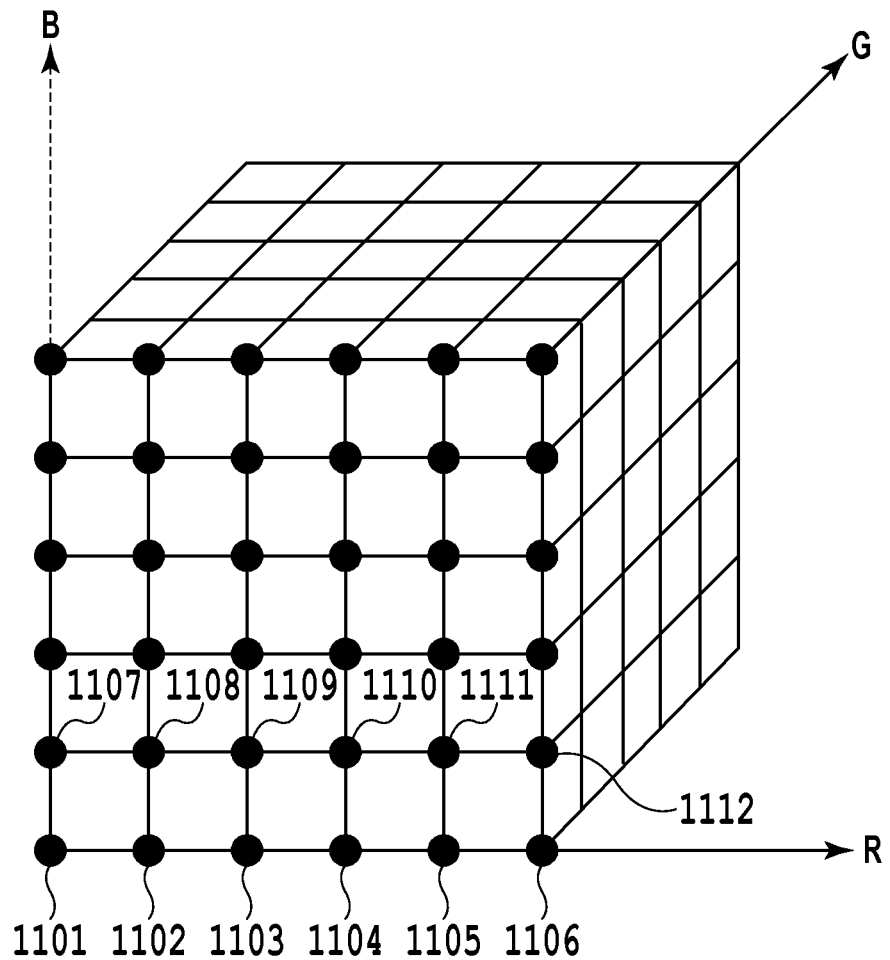
FIG. 14 is a diagram illustrating an MCS correction processing color space according to the second embodiment.

In the case of performing the MCS correction processing, it is necessary to print a large number of patches as compared with the case of the above-described head shading. FIG. 14 is a diagram illustrating an RGB color space where the MCS is performed. In FIG. 14, grid points 1101 to 1106 represent gradation values of red, and grid points 1107 to 1112 represent gradation values of red mixed with a blue component. If the RGB color space illustrated in FIG. 14 is an RGB color space that has a range of gradation values of 0 to 255 and an accuracy of 8 bits, coordinate values of a color of the grid point 1103 are (R, G, B)=(102, 0, 0). In the case of performing the MCS correction processing in the color space as illustrated in FIG. 14, the number of gradations is 6, and therefore the total number of color patches is 6×6×6=216.

Figure 15:
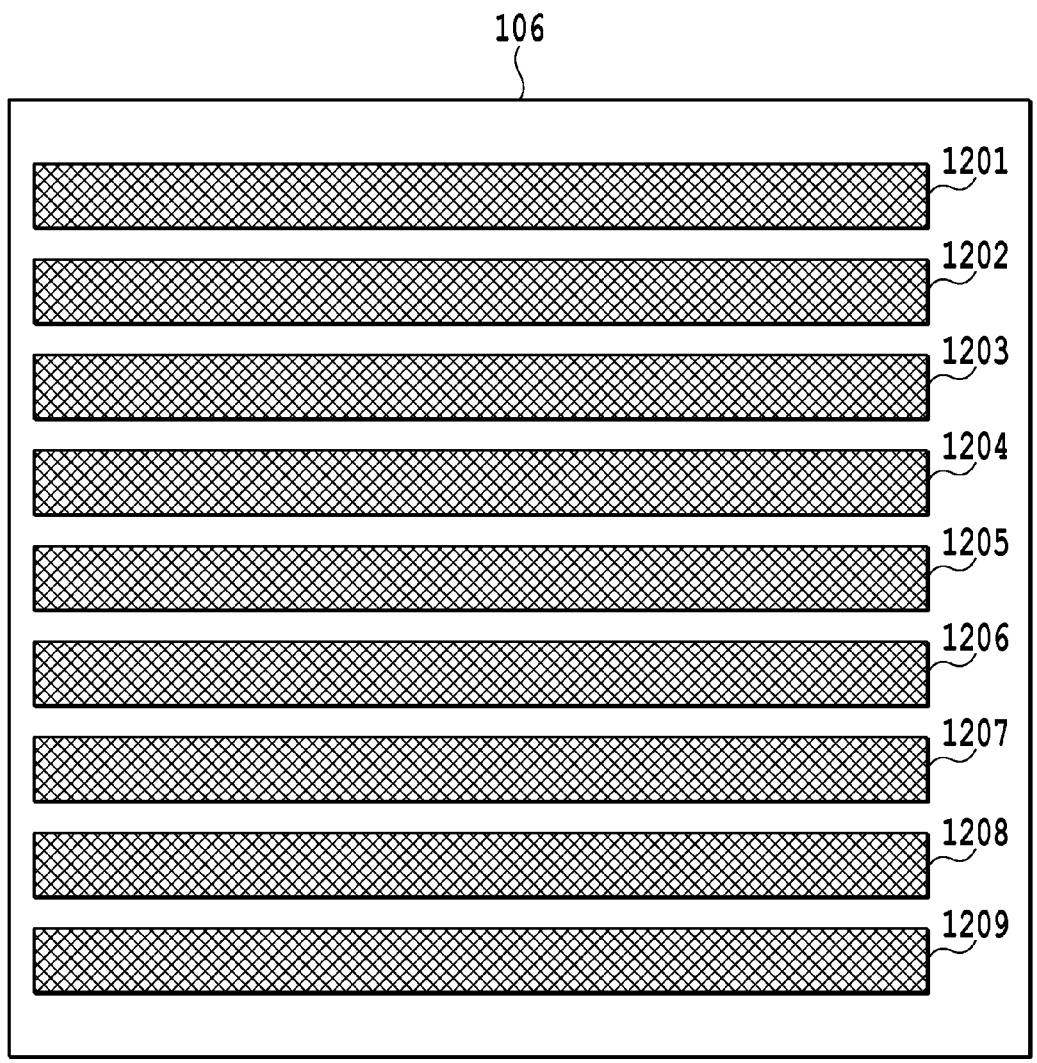
FIG. 15 is a diagram illustrating patches for MCS correction processing analysis according to the second embodiment.

FIG. 15 illustrates an example where patches respectively having colors represented by the grid points illustrated in FIG. 14 are printed on a printing medium. As illustrated in FIG. 15, on the printing medium 106, the patches respectively having the colors represented by the respective grid points are printed in a belt-like form. The patches 1201 to 1209 respectively correspond to the colors represented by the grid points 1101 to 1109 illustrated in FIG. 14. In the RGB color space that is a three-dimensional space, any of the grid points 1101, 1103, and 1108 is adjacent to the grid point 1102. Also, the patches 1201 and 1203 respectively having the colors represented by the grid points 1101 and 1103 can be arranged in positions adjacent to the patch 1202 having the color represented by the grid point 1102 on the printing medium 106. However, the patch having the color represented by the grid point 1108 cannot be arranged in a position adjacent to the patch 1202 having the color represented by the grid point 1101. That is, even if a plurality of patches have colors adjacent to each other in the color space, the patches are not necessarily adjacently arranged on the printing medium.

In the case where the patches are arranged as illustrated in FIG. 15, a variation in light amount of the light source during reading by the scanner cannot be ignored. For example, in the case of using the scanner having the light amount variation characteristic as illustrated in FIG. 7 to read the patches as illustrated in FIG. 15, a plurality of patches arranged in adjacent positions can be respectively read with light amounts close to one another. However, a plurality of patches arranged in positions separated from one another may be read with a light amount of the light source being largely varied. That is, even in the case of patches having colors that are adjacent to each other in the color space, if they are arranged in positions separated from each other on the printing medium, a light amount of the light source of the scanner may be largely varied between times when the respective patches are read. In such a case, the scanner cannot read the patches having the close colors with use of close reading characteristics. As described, in the case where the reading characteristic upon reading is largely varied, a correction amount for image data in the MCS correction processing is varied, which influences correction accuracy of the MCS correction processing.

For this reason, in the second embodiment, even in the case of printing a number of patches having colors in a three-dimensional color space, in order to enable the MCS correction processing that is not influenced by a read error of the scanner due to a light amount variation of the scanner, a correction value in the MCS correction processing is set as follows. In addition, it is assumed that the second embodiment is also provided with the configuration illustrated in FIG. 9 in the same manner as the above-described first embodiment.

Figure 16:
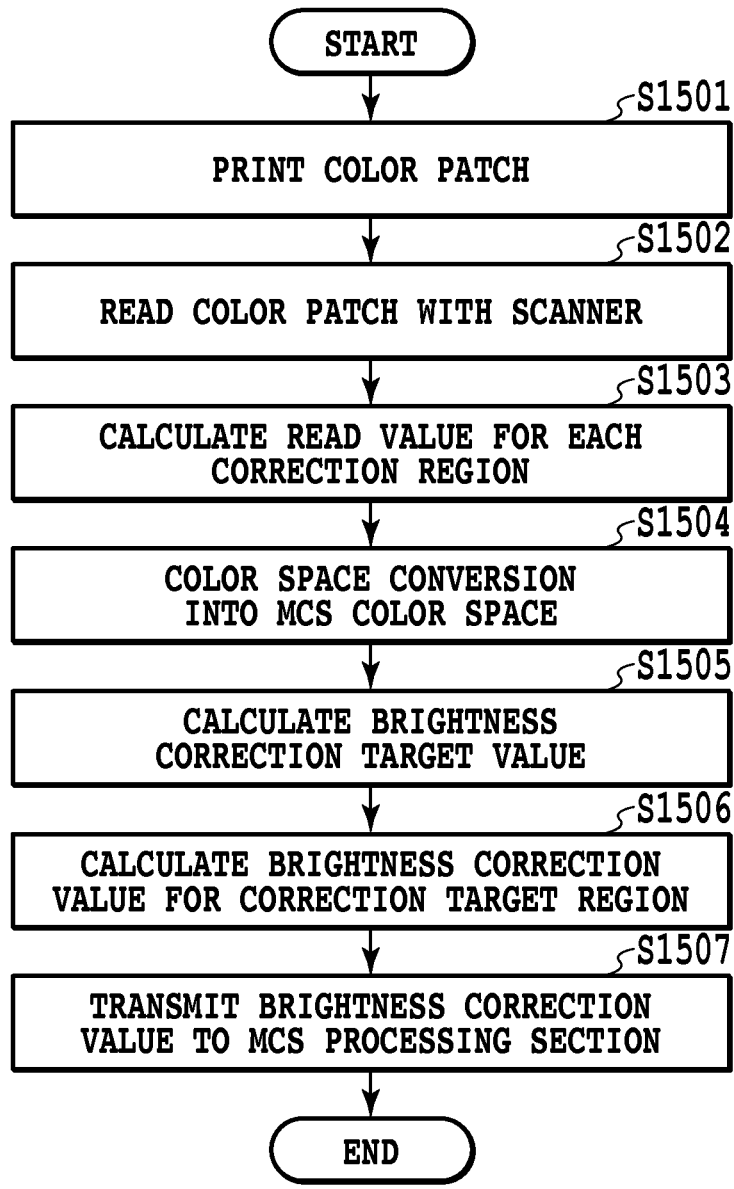
FIG. 16 is a flowchart illustrating a procedure of multi color shading (MCS) correction processing according to the second embodiment.

In the following, a method for setting a correction amount used for the MCS correction processing performed in the second embodiment is described with use of a flowchart illustrated in FIG. 16.

Figure 17A:
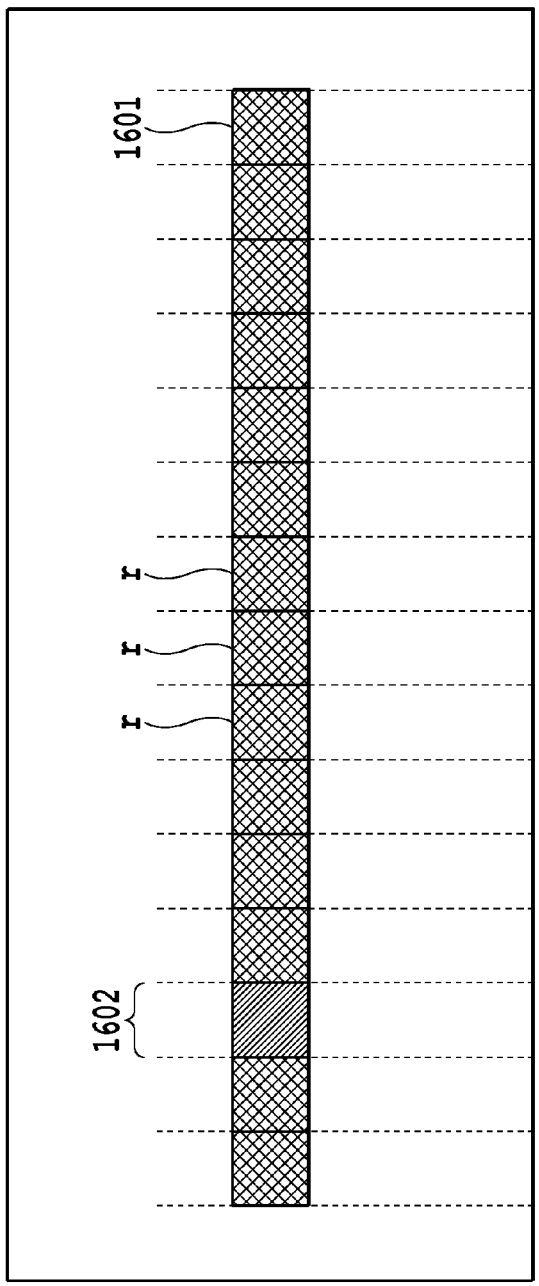
FIG. 17A is a diagram illustrating an analysis image for the MCS correction processing according to the second embodiment.

In Step S1501, the printer 100 prints a patch 1601 having a pattern as illustrated in FIG. 17A. In the second embodiment, the case where a color patch having a blue color, which is a secondary color, is printed to thereby perform the MCS correction processing is taken as an example to provide a description. If in a part of the respective heads 101 to 104 of the printer 100, a nozzle region where an ejection amount of a head is different is present, a correction region 1602 where a difference in color (color difference) occurs from correction regions printed with the other nozzle regions is formed in the printed patch as illustrated in FIG. 17A.

In Step S1502, in order to calculate, with the correction amount calculation section 706, a correction amount for performing the MCS correction processing, the patch 1601 is read by the scanner of the reader 703. In Step S1503, image data having been read is outputted to the correction region calculation section 704. In Step S1504, the correction region calculation section 704 quantifies, on the basis of the image data outputted from the scanner 703, each of the correction regions of the color patch. In this step, for each of the correction regions r that are sectioned by dashed lines in FIGS. 17A and 17B, a value (region average value) obtained by averaging density values of each of R, G, and B components read by pixels of the scanner 703 is calculated.

In Step S1504, a color represented by the region average values of each of the regions, which are obtained in the previous step S1503, is subjected to the color space conversion to a color expressed in an RGB color space that is a color space for performing the MCS correction processing. Methods for the color space conversion include a method using matrix calculation, method using a lookup table, and other methods. Also, in the present embodiment, the MCS color space is set to an RGB color space having a gradation value range of 0 to 255. Accordingly, a value of each of the color components (R, G, B) of a color expressed in the RGB color space is represented by an 8-bit signal.

In Step S1505, in the target value calculation section 705, a color specification value (target color specification value (hereinafter simply referred to as a target value)) serving as a target for correcting a color difference (difference in color) of each of the correction regions due to a difference in ejection characteristics of a nozzle is calculated in the following manner. Note that the color specification value here refers to information on a color represented by coordinate values in a color space. Accordingly, for example, a color specification value in an RGB color space refers to a combination of respective gradation values of R, G, and B.

Figure 17B:
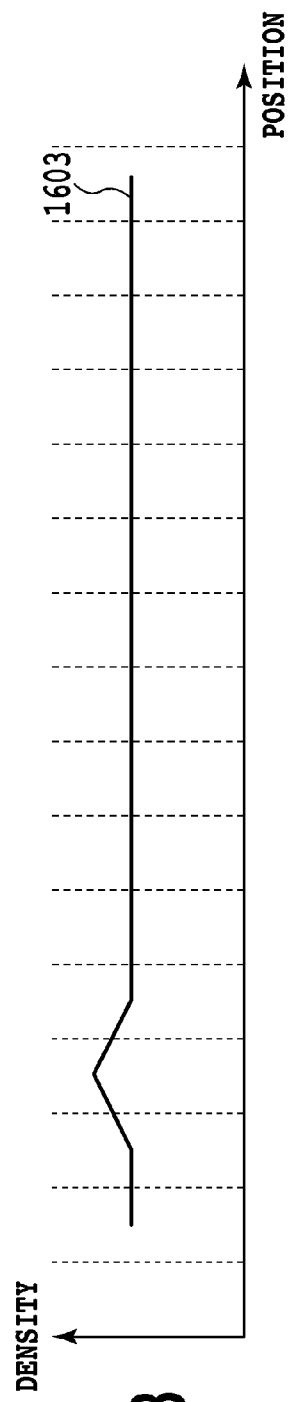
FIG. 17B is a diagram illustrating a density distribution of a patch illustrated in FIG. 17A.

It is now assumed that a region average color specification value of a color to which the color space conversion is performed exhibits a distribution as illustrated in FIG. 17B. It is also assumed that a color of the correction region 1602 recognized as color unevenness has a different color specification value from the other regions, and color specification values of the regions where no color unevenness occurs are constant. For example, it is assumed that the region average color specification value of the correction region 1602 where the color unevenness occurs corresponds to (R, G, B)=(15, 15, 205), and the other 14 region average color specification values respectively correspond to values of (R, G, B)=(10, 10, 200). In this case, respective average values of R, G, and B are obtained by Expression (6):

$$R: (15+10\times14)/15=10$$

$$G: (15+10\times14)/15=10$$

$$B: (205+200\times14)/15=200 \quad (6)$$

Accordingly, the target value is set to (10, 10, 200).

In Step S1506, the correction amount calculation section 706 uses the region average values to which the color space conversion is performed and the target value calculated in the target value calculation section 705 to calculate correction values for the color specification values. Specifically, by subtracting, from the target value, the region average values to which the color space conversion is performed, the correction amounts are obtained. Accordingly, the correction amount for the correction region 802 where the color unevenness occurs is calculated by Expression (7):

$$(R,G,B)=(10-15,10-15,200-205)=(-5,-5,-5) \quad (7)$$

In the same manner, the correction amounts for all of the other correction regions are also obtained. That is, the correction amounts for the other correction regions are calculated by Expression (8):

$$(R,G,B)=(10-10,10-10,200-200)=(0,0,0) \quad (8)$$

Based on this, regarding image data corresponding to the correction region 1602, the correction amount of (R, G, B)= (−5, −5, −5) is just added to reduce brightness, whereas regarding image data corresponding to each of the other correction regions, the correction amount for the color specification value is set to 0, i.e., image data are not corrected. This enables a color of an image, which is to be printed, to be uniformized.

In Step S1507, the correction amounts 707 calculated in the correction amount calculator 700 are sent to the printer 100, and according to the correction amounts, the MCS correction processing of the image is performed.

As described above, in the second embodiment, the target value is calculated on the basis of the region average values, and by subtracting the respective region average values from the target value, the correction amounts in the MCS correction processing are calculated. For this reason, if an error or variation (read error) occurs in a read value due to a variation, variation with time, temperature characteristics, or the like of the light source of the scanner, the read error of the scanner will be included in all of the target value and the respective region average values. Accordingly, by obtaining the correction amounts for the color specification values by subtracting the respective region average values from the target value, the read error included in the target value is cancelled out by the read error included in each of the region average values. For this reason, each of the correction amounts has a value representing color unevenness (color difference) occurring in each of the correction regions, which is caused by a variation in ejection performance of a nozzle. Therefore, by using the correction amounts to perform the MCS correction processing, an influence of the read error of the scanner can be reduced to achieve a highly accurate density correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-225749, filed Oct. 5, 2010, which is hereby incorporated by reference herein in its entirety.

What is claimed is:

1. An inkjet printer for printing an image by ejecting ink, comprising:
   a printing head, comprising a first nozzle array and a second nozzle array,
   wherein the first nozzle array comprises first nozzles arranged in a predetermined direction and constructed to eject a first ink, and the second nozzle array comprises second nozzles arranged in the predetermined direction and constructed to eject a second ink, that is a different color from the first ink;
   a print control unit constructed to cause the printing head to print:
   (i) a first multicolored patch on a first region of a printing medium by ejecting the first ink from at least one of the first nozzles included in a first nozzle group and by ejecting the second ink from at least one of the second nozzles included in a second nozzle group, and
   (ii) a second multicolored patch on a second region of the printing medium, the second region being different from the first region in the predetermined direction, by ejecting the first ink from at least one of the first nozzles included in a third nozzle group and which is not included in the first nozzle group, and by ejecting the second ink from at least one of the second nozzles included a fourth nozzle group and which is not included in the second nozzle group;
   an acquisition unit configured to acquire a first measurement value by measuring the first multicolored patch and a second measurement value by measuring the second multicolored patch;
   a first determination unit configured to determine a target value based on the first and second measurement values; and a second determination unit configured to:
(i) determine first correction parameters for correcting first image data corresponding to a first image to be printed by using the first nozzle group and the second nozzle group based on the first color measurement value and the target value, and
(ii) determine second correction parameters for correcting second image data to be printed by using the third nozzle group and the fourth nozzle group based on the second color measurement value and the target value,
wherein the first and second correction parameters are parameters for outputting output data that includes a plurality of color components based on input data that includes a plurality of color components.

2. The inkjet printer according to claim 1,
wherein the acquisition unit is further configured to acquire a plurality of color measurement values by measuring a plurality of multicolored patches respectively printed on a plurality of regions of the printing medium using the first ink and the second ink, and
wherein the first determination unit is further configured to determine the target value to be any one of an average value, a maximum value, and a minimum value among the plurality of color measurement values.

3. The inkjet printer according to claim 1,
wherein the acquisition unit is further configured to acquire a plurality of color measurement values by measuring a plurality of multicolored patches respectively printed on a plurality of regions of the printing medium using the first ink and the second ink, and
wherein the first determination unit is further configured to determine, as the target value, any one of an average value, a maximum value, and a minimum value, based one of the plurality of color measurement values whose distance in a color space is equal to or less than a predetermined distance.

4. The inkjet printer according to claim 1, further comprising:
a correction unit configured to correct the first image data and the second image data using the first and second correction parameters, respectively.

5. The ink jet printer according to claim 1, wherein the plurality of color components of the input data is R data, G data, and B data.

6. The ink jet printer according to claim 1, wherein the plurality of color components of the output data is R data, G data, and B data.

7. The ink jet printer according to claim 1,
wherein the first nozzle group includes a plurality of the first nozzles, the third nozzle group includes another plurality of the first nozzles, the second nozzle group includes a plurality of the second nozzles, and the fourth nozzle groups includes another plurality of the second nozzles.

8. An image processor that processes image data for printing an image by ejecting ink from a printing head, the printing head comprising: (i) a first nozzle array comprising first nozzles arranged in a predetermined direction and constructed to eject a first ink, and (ii) a second nozzle array comprising second nozzles arranged in the predetermined direction and constructed to eject a second ink, that is a different color from the first ink,
wherein the printing head is constructed to print: (i) a first multicolored patch on a first region of a printing medium by ejecting the first ink from at least one of the first nozzles included in a first nozzle group and by ejecting the second ink from at least one of the second nozzles included in a second nozzle group, and (ii) a second multicolored patch on a second region of the printing medium, the second region being different from the first region in the predetermined direction, by ejecting the first ink from at least one of the first nozzles included in a third nozzle group and which is not included in the first nozzle group, and by ejecting the second ink from at least one of the second nozzles included a fourth nozzle group and which is not included in the second nozzle group, the image processor comprising:
an acquisition unit configured to acquire a first measurement value by measuring the first multicolored patch and a second measurement value by measuring the second multicolored patch;
a first determination unit configured to determine a target value based on the first and second measurement values; and
a second determination unit configured to:
(i) determine first correction parameters for correcting first image data corresponding to a first image to be printed by using the first nozzle group and the second nozzle group based on the first color measurement value and the target value, and
(ii) determine second correction parameters for correcting second image data to be printed by using the third nozzle group and the fourth nozzle group based on the second color measurement value and the target value,
wherein the first and second correction parameters are parameters for outputting output data that includes a plurality of color components based on input data that includes a plurality of color components.

9. The image processor according to claim 8,
wherein the acquisition unit is further configured to acquire a plurality of color measurement values by measuring a plurality of multicolored patches respectively printed on a plurality of regions of the printing medium using the first ink and the second ink, and
wherein the first determination unit is further configured to determine the target value to be any one of an average value, a maximum value, and a minimum value among the plurality of color measurement values.

10. The image processor according to claim 8,
wherein the acquisition unit is further configured to acquire a plurality of color measurement values by measuring a plurality of multicolored patches respectively printed on a plurality of regions of the printing medium using the first ink and the second ink, and
wherein the first determination unit is further configured to determine, as the target value, any one of an average value, a maximum value, and a minimum value based on one of the plurality of color measurement values whose distance in the color space is equal to or less than a predetermined distance.

11. The image processor according to claim 8, further comprising:
a correction unit configured to correct the first image data and the second image data using the first and second correction parameters, respectively.

* * * * *